This invention relates to the art of making refractory shapes, and more particularly, to fired basic refractory shapes having utility in fabricating certain portions of structures useful in the manufacture of glass. In one specific aspect, it relates to the fabrication of fired basic refractory shapes suitable for use in glass tank regenerator checker construction.

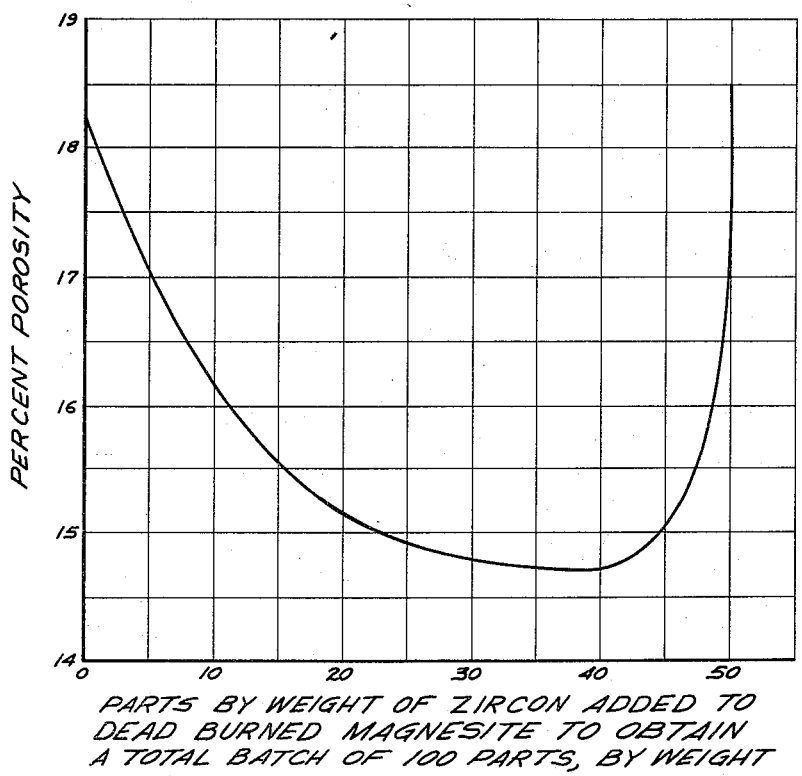
PARTS BY WEIGHT OF ZIRCON ADDED TO
DEAD BURNED MAGNESITE TO OBTAIN
A TOTAL BATCH OF 100 PARTS, BY WEIGHT
INVENTORS
WILLIAM R. GOOD
BEN DAVIES
BY
ATTORNEY 3,192,059
VOLUME STABLE REFRACTORY AND METHOD OF MAKING SAME
William R. Good, Homestead, and Ben Davies, Pittsburgh, Pa., assignors to Harbison-Walker Refractories Company, Pittsburgh, Pa., a corporation of Pennsylvania
Filed June 28, 1963, Ser. No. 291,442
3 Claims. (Cl. 106—57)

Glass tank regenerator checker structure, among other things, requires ability to resist cyclic change in temperature and atmosphere without spalling, ability to resist the attack of alkalies and other corrosive materials in gases and fumes passing in contact therewith, and ability to sustain load at elevated temperatures without deformation.

Fired, basic refractory brick have been recognized in the art as desirable for the construction of glass tank regenerator checker structure. For example, fired brick made of dead burned magnesite or magnesia (we use these terms interchangeably in this specification) have been suggested for this purpose. By "dead burned" magnesite, we mean magnesite fired to a high temperature to produce grain consisting mostly of well developed periclase crystals and to distinguish it from lower temperature calcined caustic magnesite. However, fired brick made of dead burned magnesite have a distressing propensity to spall under cyclic variation in temperature. Various fluxes, dead burning agents, etc., have been suggested as additives to the grain or the brick to increase density and to resist the spalling tendencies thereof; but such fluxes, etc., while increasing the density and in some instances reducing the spalling tendency, decrease the refractoriness of the fired brick, reduce its resistance to corrosive atmospheres and are, generally, not all that might be desired.

The prior art has suggested mixing zircon with magnesite to obtain a refractory batch mixture. The earliest work on this subject, of which we are aware, is Rees and Chesters, Trans. Ceramic Soc., London, vol. 29, page 309, May 1930, which suggested a mixture of magnesite and zircon with ball clay, apparently as a dead burning agent, to form a new refractory compound.

Comstock, in United States Patent No. 1,952,120, recognizes the Rees and Chesters contribution to the art, but notes certain difficulties when following the teachings thereof. Comstock suggests the preparation of a magnesite-zircon grog. This grog is made by grinding magnesite and zircon to a powder, fusing a mixture of about 80% of the powdered zircon and 20% of the powdered magnesite, cooling the fusion, and then powdering it; and using this powdered fused material as a binder for additional coarse magnesite. This magnesite bonded with powdered, fused grog is made into shapes and fired to about 2800° F. Comstock claims good volume constancy and resistance to spalling, for shapes made according to this method. It is, of course, evident that this double grinding or powdering and double burning or firing procedure, as suggested by Comstock, can be quite expensive in labor and materials treatment.

Accordingly, it is an object of this invention to provide dimensionally stable, fired basic refractories, batches for the manufacture thereof, and method of manufacture therefor.

Another object of the invention is to provide fired basic refractory particularly suited for fabrication of glass tank regenerator checker structure.

This invention relates to brick which are chemically characterized as mainly MgO, $2MgO.SiO_2$, and $ZrO_2$. The main emphasis of this invention is on the structure of fired shape or brick, though, rather than on chemical content. It should be noted that the chemical content of fired brick can be arrived at in several ways. For example, similar chemical content can be obtained by using preformed grog made by dead burning or firing a mixture of magnesite and zircon or by adding a mixture of silica and zirconia to magnesia brick mixes. However, these latter manufacturing methods do not give brick with the properties or structure of the brick of the instant invention even through the chemical content or analysis may be the same or similar. The key to our invention resides, according to one aspect, in the discovery of the fact that an expanding reaction

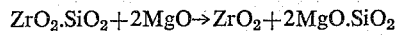
$$ZrO_2.SiO_2 + 2MgO \rightarrow ZrO_2 + 2MgO.SiO_2$$

does not cause the brick as a whole to expand. Instead, the reaction products expand into the inter-granular pore structure of the brick and form not only a brick of reduced porosity and permeability but also foster an intimate bond between coarse magnesia grain and the matrix to produce a brick exhibiting a marked improvement in strength at 2300° F. (This is representative of glass tank working temperature.)

According to this invention, we provide fired refractory shapes suitable for use in glass tank regenerator checker construction, which shapes are made from a specially fabricated batch mixture. The batch mixture consists essentially of dead burned magnesite and zircon. The batch, by weight and on the basis of an oxide analysis is comprised of 60 to 90% MgO and 40 to 10% $ZrO_2.SiO_2$ supplied by the dead burned magnesite and zircon, respectively. It is essential there be no more than about 5%, by weight, on the basis of an oxide analysis, of CaO, $Al_2O_3$ and $Fe_2O_3$ in the dead burned magnesite; and no more than about 2% of the total batch can be CaO. The $SiO_2$ content of the magnesite can probably be as high as 10% although we prefer an MgO content of at least 90% for the magnesite which, together with the impurity ingredients just discussed, severely delimits the $SiO_2$ content in the magnesite used in an optimum mix.

The zircon all passes a 100 mesh Tyler screen; and there is sufficient dead burned magnesite, also passing a 65 and preferably a 100 mesh screen, to provide at least 2 moles of MgO (on an oxide analysis) for each mole of

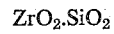
$$ZrO_2.SiO_2$$

(also on an oxide analysis). Sufficient additional moles of MgO pass the 100 mesh screen to cause stabilization of the $ZrO_2$ (zirconia). The remaining magnesite in the batch rests on a 100 mesh screen and at least about 50% of the total magnesite content of the batch rests on a 28 mesh screen.

Petrographically, fired shapes, which are made from the foregoing batch, are characterized by coarse textured periclase grain bonded together by a forsteritic matrix, which matrix is the reaction product of an in situ solid-state reaction between MgO of the dead burned magnesite and $SiO_2$ of the zircon. This reaction occurs during firing of the shapes. These shapes are, also, characterized by spaced deposits of stabilized zirconia distributed through the forsteritic matrix. These deposits may be skeletal relics of zircon particles from which the $SiO_2$ has been removed to react with the magnesite to form forsterite. The porosity of the fired shapes is less than about 16%. The modulus of elasticity, E values $\times 10^{+6}$, is usually below about 8; and the shapes are characterized by excellent volume stability under cyclic temperature change as is experienced in glass tank checker service.

A better understanding and other objects and advantages of fired basic refractory shapes according to this invention will become apparent to those skilled in the art from a study of the following detailed description, with reference to the attached drawing. The drawing is a plot of percent porosity vs. parts, by weight, of zircon in the batch.

The following examples are exemplary of the best modes now known for the practice of our invention; but we do not wish to be limited thereto but, rather, note that the true spirit and scope of the invention is as defined in the appended claims. In the following discussions, all parts and percentages are by weight unless specified as mole percent. All analyses are on the basis of an oxide analysis, in accordance with the conventional practices of reporting the chemical content of refractory materials. All size grading is according to the Tyler standard series of screens unless otherwise mentioned.

A series of size graded batch mixtures, of relatively high purity dead burned magnesia or magnesite grain of the type made according to U.S. Patent No. 3,060,000, were mixed with varying quantities of commercially available raw zircon, to obtain varying zircon-dead burned magnesite weight ratios. The resulting batches were formed into shapes on a conventional mechanical power press at about 8000 p.s.i. Identical brickmaking techniques were used in making shapes from each batch; and the resulting shapes were fired and subjected to physical testing under identical conditions. Table I provides detail of the mixes tested and the results of the physical testing.

As mentioned, the preferred oxide analysis of shapes according to this invention is between 60 and 90% MgO and between 40 and 10% $ZrO_2 \cdot SiO_2$. Mixes C, D and E of Table I are, thus, preferred mixes of the invention. As a 50–50 MgO–$ZrO_2 \cdot SiO_2$ mix (Mix F of Table I) is approached, modulus of rupture at 2300° F. drops off very rapidly and the porosity increases quite surprisingly. As a 90–10 MgO–$ZrO_2 \cdot SiO_2$ mix (Mix B of Table I) is approached, the density falls off as does the modulus of rupture at 2300° F. and the volume expansion in the cyclic checker furnace test increases more than might be desired. More important, however, is the fact shapes made from Mix B, which is the 90–10 mix of Table I, exhibited rather more cracking after 500 cycles than is desired.

It, thus, becomes clear that Mixes C, D and E of Table I provide good refractories according to this invention, having excellent density, good strength at elevated temperatures, amazingly low porosity, and good volume stability under cyclic temperature conditions. Mix B is less satisfactory and Mix F is unsatisfactory.

An interesting feature meriting more comment is the low porosity which is obtained in shapes according to this invention. As long as the zircon amounts to less than 50% but no less than 10%, and preferably between about 20 and 40%, there is a decrease in porosity upon firing. This porosity decrease is not due to shrinkage on firing and is not entirely understood; but it is known that, within this carefully controlled range of zircon addition, there is a solid-state reaction between the fine MgO and the zircon to produce a forsterite matrix with stabilized zirconia dis-

TABLE I

| Mix | A | B | C | D | E | F |
|---|---|---|---|---|---|---|
| Magnesite, 4/10 (mesh), percent | 30 | 30 | 30 | 30 | 30 | 30 |
| Magnesite, 10/28 (mesh), percent | 35 | 35 | 35 | 28 | 14 | 0 |
| Magnesite, b.m.f.,[1] percent | 35 | 25 | 15 | 12 | 16 | 20 |
| Zircon, granual,[2] percent | | | | 10 | 20 | 30 |
| Zircon, −600 mesh, percent | | 10 | 20 | 20 | 20 | 20 |
| Burn | Cone 23—Temperature (10 hr. hold), 2,820° F. | | | | | |
| Linear change in burning, percent | 0.0 | −0.3 | −0.4 | −0.3 | 0.0 | +1.3 |
| Bulk density, p.c.f. | 179 | 186 | 189 | 196 | 200 | 198 |
| Modulus of rupture, p.s.i. at 2,300° F. | 180 | 550 | 890 | 1,310 | 1,660+ | 670 |
| Apparent porosity, percent | 18.2 | 16.2 | 15.1 | 14.8 | 14.7 | 18.0 |
| Modulus of elasticity, p.s.i. (Av. 3) E values × 10$^{+6}$ | 12.5 | 12.8 | 5.3 | 6.5 | 7.5 | 3.7 |
| Cyclic checker furnace test (23 min. cycles, 2,270° to 2,700° F.)—volume change: | | | | | | |
| 500 cycles | +2.2 | +1.8 | +1.1 | +1.4 | +0.2 | |
| 1,000 cycles | +3.6 | +2.4 | +1.4 | +1.8 | | |

[1] Mixes A–F prepared with regular ball mill fines nominally 100% −65 mesh, 45% −325 mesh.
[2] Typically sized, as follows: 100% −65+200 mesh, 90% −100+150 mesh.

For the cyclic checker furnace test, reported in Table I, the test procedure is substantially as follows:

This is a qualitative test used to determine the comparative resistance of various brick to cracking, dimensional change and loss of strength, when subjected to cyclic temperature changes in a gas fired cyclic checker furnace. Full size brick are tested according to this method; and there is a degree of cyclic atmospheric conditions inherent in this test, since the brick are subjected to products of combustion, plus slight excess air on the heating cycle and straight air on the cooling cycle. A standard test consists of 500 cycles (about 8 days). The test is conducted in a cyclic checker furnace, which is a downdraft gas-fired kiln that will hold about a dozen test brick of about 9 x 4½ x 2½" dimension. The furnace is brought to an upper or top temperature manually by suitable manipulation of fuel and air feed. The upper temperature and a selected lower temperature are then set on automatic instrumentation, which controls the fuel-air mixture to the furnace so it will automatically cycle between the set bottom and top temperatures.

tributed therethrough. Based on the true specific gravity of the reactants and products, apparently this is an expanding reaction which causes preferential filling of intergranular cavities between coarser periclase grain within the body of the shape being fired without causing overall volume expansion or cracking, at least to any unacceptable degree.

With shapes made of a 50–50 MgO–$ZrO_2 \cdot SiO_2$ combination, there is not the filling of interior interstitial pores such as to decrease porosity. In fact, upon firing, the entire brick or shape expanded and the interior porosity increased to some degree. The foregoing may have been due to insufficient fine −65 mesh MgO in the batch.

Some cracking from cyclic temperatures, which is found in shapes as the 90 MgO–10 $ZrO_2 \cdot SiO_2$ combination is approached, may be due to lack of adequate bond formation.

Table II sets forth exemplary chemical analyses of the dead burned magnesite and zircon, which were used for the tests reported in Table I.

TABLE II

Magnesite
| | Percent |
|---|---|
| Silica ($SiO_2$) | 0.7 |
| Alumina ($Al_2O_3$) | 0.3 |
| Iron Oxide ($Fe_2O_3$) | 0.3 |
| Lime (CaO) | 0.9 |
| Magnesia (MgO) | 97.5 |
| Loss on ignition | 0.1 |

Zircon
| | |
|---|---|
| Silica ($SiO_2$) | 32.3 |
| Alumina ($Al_2O_3$) | 1.0 |
| Titania ($TiO_2$) | 0.2 |
| Iron Oxide ($Fe_2O_3$) | 0.2 |
| Lime (CaO) | 0.16 |
| ($ZrO_2$) | 66.1 |
| Magnesia (MgO) | 0.04 |

Attention is directed to the drawing which is a plot of percent porosity vs. batch ingredients. The optimum mixes of the invention are between 70–30 and 60–40 magnesite to zircon, wherein the porosity is less than about 15%. Satisfactory porosities of less than about 16% are found between 80–20 and 55–45 dead burned magnesite-zircon mixes. The slope of the plot of percent porosity, as one approaches the 90–10 dead burned magnesite-zircon position, is gentle, which indicates less criticality as one approaches this end of possible combinations of magnesite and zircon, at least as compared to the very sharp slope of the plot on the other end of the scale of possible batch ingredient combinations. Table III shows the results of testing, in which a less pure dead burned magnesite was used to make shapes according to this invention.

TABLE III

| Mix | G | H | I | J | K | L |
|---|---|---|---|---|---|---|
| Magnesite, 3/8 (mesh), percent | 30 | 30 | 30 | 30 | 30 | 30 |
| Magnesite, 8/28 (mesh), percent | 35 | 35 | 35 | 35 | 32 | 28 |
| Magnesite, b.m.f.,[1] percent | 35 | 25 | 20 | 15 | 13 | 12 |
| Zircon, granular,[2] percent | | | | | 5 | 10 |
| Zircon, –600 mesh, percent | | 10 | 15 | 20 | 20 | 20 |
| Burn | Cone 23—Temperature (10 hr. hold), 2,820° F.) | | | | | |
| Linear change in burning, percent | –0.3 | –1.0 | –1.1 | –1.1 | –0.8 | –0.3 |
| Bulk density, p.c.f. | 178 | 184 | 187 | 187 | 191 | 191 |
| Modulus of rupture, p.s.i. at 2,300° F. | 250 | 640 | 730 | 900 | 990 | 1,100 |
| Apparent porosity (Av. 3), percent | 18.1 | 16.0 | 16.0 | 16.0 | 16.4 | 16.1 |
| Sonic modulus of elasticity E values × $10^{+6}$ | 13.4 | 14.0 | 7.9 | 7.2 | 8.3 | 8.6 |
| Cyclic checker test, 2,270° F. to 2,700° F.—Volume change (500 cycles) | +2.7 | +2.3 | +1.7 | +1.6 | +1.0 | +1.2 |

[1] Mixes G–L prepared with regular ball mill fines the sizing of which was nominally the same as noted in Table I.
[2] Sizing nominally the same as note in Table I for granular zircon.

The somewhat less desirable porosities reported in Table III are thought to be the result of using lower density magnesite grain, i.e. that of Table II had a bulk specific gravity on the order of 3.25 gms./cc. while that of Table IV was on the order of 3.15 gms./cc. The chemical analysis of the magnesite used in Table III is as follows:

TABLE IV

Dead burned magnesite
| | Percent |
|---|---|
| Silica ($SiO_2$) | 2.8 |
| Alumina ($Al_2O_3$) | 0.3 |
| Iron Oxide ($Fe_2O_3$) | 0.6 |
| Lime (CaO) | 1.5 |
| Magnesia (MgO) | 94.8 |

The zircon used was the same as that reported in Table II, above.

As a general rule, the MgO content of the magnesite used should be at least about 90%, by weight, and preferably 95%. In order to maintain the porosity of resulting fired shapes below about 16% the BSG of the magnesite grain should be above about 3.00 gms./cc. and preferably above about 3.10 gms./cc. Of course, the 16% porosity, obtained with the 94.8% MgO content, dead burned magnesite of Table IV, is satisfactory; although it is not as good as that obtained with the purer and denser dead burned magnesite of Table II. Petrographically, shapes made in the tests as reported in Table III, were substantially the same as those made in the tests as reported in Table I. Of course, the same manufacturing techniques were used for both Table I and Table III mixes and test shapes.

Further study has shown that the total CaO, $Al_2O_3$ and $Fe_2O_3$ content of the magnesite must be no more than about 5%. Further, the total CaO content of the entire batch must be less than about 2%. Iron oxide impurity considerably reduces the ability of the resulting shapes to resist deformation under load, which is particularly distressing when the brick are to be used as lower members of regenerator checker construction. The $Al_2O_3$ appears to interfere with the solid-state reaction to form forsterite in situ. The CaO reacts with the desired forsterite matrix to form low melting point monticellite.

Having thus described the invention in detail and with sufficient particularity as to enable those skilled in the art to practice it, what is desired to have protected by Letters Patent is set forth in the following claims.

We claim:

1. A fired, volume stable, refractory shape suitable for use in glass tank regenerator checker construction made from a refractory batch mixture consisting essentially of: coarser dead burned magnesite grain, and finely divided zircon; the batch, by weight and on the basis of an oxide analysis, being 60 to 90% MgO and 40 to 10% $ZrO_2 \cdot SiO_2$ supplied by the dead burned magnesite and zircon, respectively; there being no more than 5%, by weight on the basis of an oxide analysis, of CaO, $Al_2O_3$, and $Fe_2O_3$ in said dead burned magnesite, and no more than 2%, by weight on the basis of an oxide analysis, of CaO in the total batch; the zircon all passing a 65 mesh screen and there being a sufficient quantity of dead burned magnesite passing a 65 mesh screen to provide at least two moles of MgO for each mole of $ZrO_2 \cdot SiO_2$, and sufficient additional moles of MgO passing a 65 mesh screen to cause stabilization of the $ZrO_2$; substantially all of the remaining magnesite resting on a 100 mesh screen, at least about 50% of the total magnesite content of the batch resting on a 28 mesh screen, said magnesite having a bulk specific gravity on the order of at least 3.00 gms./cc.; the shape having an apparent porosity of no more than about 16%; petrographically, said fired shape characterized by coarser textured periclase grains bonded together by a forsterite matrix which is a reaction product of an in situ solid-state reaction between MgO of the dead burned magnesite and $SiO_2$ of the zircon during firing, and there being spaced deposits of stabilized zirconia distributed through the forsterite matrix.

2. The shape of claim 1 in which the batch from which it is made, by weight and on an oxide basis, has 60 to 80% MgO.

3. Method of making a fired refractory shape suitable for use in glass tank regenerator checker construction comprising the steps of: fabricating a refractory batch mixture consisting essentially of coarser dead burned magnesite grain, and finely divided zircon, the batch, by weight and on the basis of an oxide analysis, being 60 to 90% MgO and 40 to 10% $ZrO_2 \cdot SiO_2$ supplied by the dead burned magnesite and zircon, respectively, there being no more than 5%, by weight on the basis of an oxide analysis, of CaO, $Al_2O_3$, and $Fe_2O_3$ in said dead burned magnesite, and no more than 2%, by weight and on the basis of an oxide analysis, of CaO in the total batch, the zircon all passing a 65 mesh screen and there being a sufficient quantity of dead burned magnesite passing a 65 mesh screen to provide at least two moles of MgO, on an oxide analysis, for each mole of $ZrO_2 \cdot SiO_2$, and sufficient additional moles of MgO passing a 65 mesh screen to cause stabilization of the $ZrO_2$, the remaining magnesite resting on a 100 mesh screen, at least about 50% of the total magnesite content of the batch resting on a 28 mesh screen, said magnesite having a bulk specific gravity on the order of at least 3.00 gms./cc.; the shape having an apparent porosity of no more than about 16%; forming shapes from the batch, firing the shapes under conditions which cause decrease in interior interstitial pore space but without overall volume expansion of the shapes to yield fired shapes petrographically characterized by coarser textured periclase grain bonded together by a forsterite matrix which is a reaction product of an in situ solid-state reaction between MgO of the dead burned magnesite and $SiO_2$ of the zircon during firing, with spaced deposits of stabilized zirconia distributed through the forsterite.

References Cited by the Examiner
UNITED STATES PATENTS 2,669,636  2/54  Rawles _____ 106—57
2,812,265  11/57 Folsom _____ 106—57

TOBIAS E. LEVOW, *Primary Examiner.*